United States Patent [19]
Noiles

[11] 3,807,397
[45] Apr. 30, 1974

[54] DOUBLE DRIP CHAMBER FOR INTRAVENOUS SYTEMS

[75] Inventor: Douglas G. Noiles, New Canaan, Conn.

[73] Assignee: United States Surgical Corporation, Baltimore, Md.

[22] Filed: Sept. 28, 1972

[21] Appl. No.: 293,162

[52] U.S. Cl............................................ 128/214 C
[51] Int. Cl............................................. A61m 5/00
[58] Field of Search...... 128/214.2, 214 C; 222/158, 222/159, 420; 210/94

[56] References Cited
UNITED STATES PATENTS
2,186,987  1/1940  Nesset............................ 128/214 C
3,233,457  2/1966  Martinez......................... 128/214.2
FOREIGN PATENTS OR APPLICATIONS
1,158,634  1/1958  France............................ 128/214 C Primary Examiner—Lawrence W. Trapp
Attorney, Agent, or Firm—Fleit, Gipple & Jacobson

[57] ABSTRACT

A drip chamber for use in an intravenous feeding system includes a main body portion made from a transparent flexible tube. A constrictor means is located in the approximate longitudinal center of the transparent flexible tube and serves to separate the transparent flexible tube into an upper drip chamber and a lower drip chamber. The upper drip chamber is adapted to produce 60 drops per milliliter of parenteral fluid, while the lower drip chamber is adapted to produce 15 drops per milliliter. With this design, the inventive double drip chamber provides an easily measurable number of drops per minute of parenteral fluid, and hence easy determination of parenteral fluid flow rate, regardless of the fluid flow rate magnitude.

11 Claims, 3 Drawing Figures

PATENTED APR 30 1974　　　　　　　　　　　　　　　3,807,397

DOUBLE DRIP CHAMBER FOR INTRAVENOUS SYTEMS

BACKGROUND OF THE INVENTION

The present invention relates to an improved drip chamber for use in intravenous parenteral fluid feeding systems.

The use of intravenous feeding systems to feed various parenteral solutions directly into the blood stream of a patient is well known. Such feeding systems typically take the form of a supply reservoir for holding a quantity of parenteral fluid, a flexible plastic tube for transporting the parenteral fluid from the supply reservoir to the patient, and an intravenous needle for interjecting the parenteral solution from the plastic tubing directly into the patient's veins.

In order to accurately meter the flow rate of the parenteral fluid delivered to the patient's bloodstream, a number of prior art systems have been developed. The most commonly employed flow meter system is referred to as a drip chamber and is composed of a transparent tube of a comparatively large diameter which is positioned intermediate the fluid supply reservoir and the intravenous needle. The transparent tube is vertically positioned with its inlet opening above its outlet opening so that parenteral fluid flowing from the supply reservoir falls in drops from the inlet opening of the tube to the bottom of the tube, where it collects and is passed out of the outlet opening of the tube. The number of drops falling through the transparent tube per unit time is simply determined to indicate the fluid flow rate of the parenteral solution.

Another flow meter system developed for intravenous feeding systems uses a rotameter type flow meter. One such flow meter is shown in U.S. Pat. No. 3,034,504 issued to Winsor et al. This meter was improved by Smith who was later granted U.S. Pat. No. 3,587,313. In using rotameter type flow meters, the height of the flow measuring indicator is simply monitored since this height directly indicates the flow rate of the parenteral solution flowing therethrough. An improved flow meter was then developed by the inventor of the present invention and embodied in U.S. Pat. Application Ser. No. 261,323, entitled Flow Meter for Parenteral Solutions.

While the later two types of flow meters noted in the preceding paragraph are capable of measuring parenteral fluid flow rates with a relatively high degree of accuracy, the medical profession has nonetheless been reluctant, at least at the present time, to give full faith to the indicated flow rates. Accordingly, it has become the practice to provide IV systems with both rotameter-type flow meters and drip chamber-type flow meters for back-up use. The rotameter-type unit is read, and then the drip chamber drops are counted to confirm the reading of the rotameter. While this practice is wasteful for obvious reasons, the waste is compounded by the fact that the frequently used flow rates vary considerably from one application to the next. Accordingly, there are presently being marketed two sizes of drip chambers--one for fast flow rates (adult) and one for slower flow rates (pediatric). Therefore, the manufacturer of drip chambers must maintain a stock of two sizes of chambers, and of course passes his increased costs along to the customer.

Accordingly, it is an object of this invention to provide a single drip chamber-type flow meter for effective back-up or sole use in an intravenous feeding system, notwithstanding the flow rate of the parenteral fluid being monitored.

SUMMARY OF THE INVENTION

This and other objects are accomplished according to the present invention wherein a flexible-wall transparent drip chamber including a body portion formed from an elongated transparent flexible tube is provided intermediate its ends with a constriction so that a two-stage drip chamber is in effect formed. The inlet opening of the drip chamber is adapted to form drops of a particular size, such as for example 1/60 of a milliliter, while the intermediate constriction is adapted to form drops of a different size, such as for example 1/15 of a milliliter.

In use, the inventive flow meter is positioned vertically in a manner similar to the positioning of a conventional drip chamber, and parenteral fluid is fed to its inlet opening. There, the parenteral fluid is formed into drops of one size, which drops fall through the upper portion of the transparent flexible tube. At the constriction, the parenteral fluid collects momentarily until drops of a different size are formed at the constriction orifice. These differently sized drops then pass out of the constriction orifice and fall through the lower portion of the transparent flexible tube to the tube outlet. Measurement of the number of drops per unit time falling in either chamber accurately indicates the flow rate of the parenteral solution flowing through the system. And, because each stage forms drops of significantly different size and hence drop rate, the inventive drip chamber can be conveniently used for both adult and pediatric feedings.

Furthermore, because the two serially-connected drip chamber stages of the inventive flow meter form drops of different sizes, a determination of the parenteral solution flow rate can be easily accomplished regardless of its magnitude. The nurse monitoring the fluid flow rate can count either from the upper or the lower chamber, and hence can minimize fatigue and maximize accuracy.

BRIEF DESCRIPTION OF THE DRAWINGS

The present invention may be more easily understood by reference to the following drawings wherein:

Intermediate parenteral solution reservoir 10 and delivery tube 12 is the inventive flow meter, which is generally indicated at 24. As shown in FIG. 2, the inventive flow meter is composed of an inlet piercing piece 26, a transparent flexible tube 28 and an outlet piece 30. Inlet piece 26 is cylindrical in shape and provided with a pointed end 32 so that it can be inserted through cap 20 of parenteral solution reservoir 10. A small passageway 34 is provided in inlet piece 26 so that parenteral fluid 18 in parenteral solution reservoir 10 can flow into the inventive flow meter.

Figure 1:
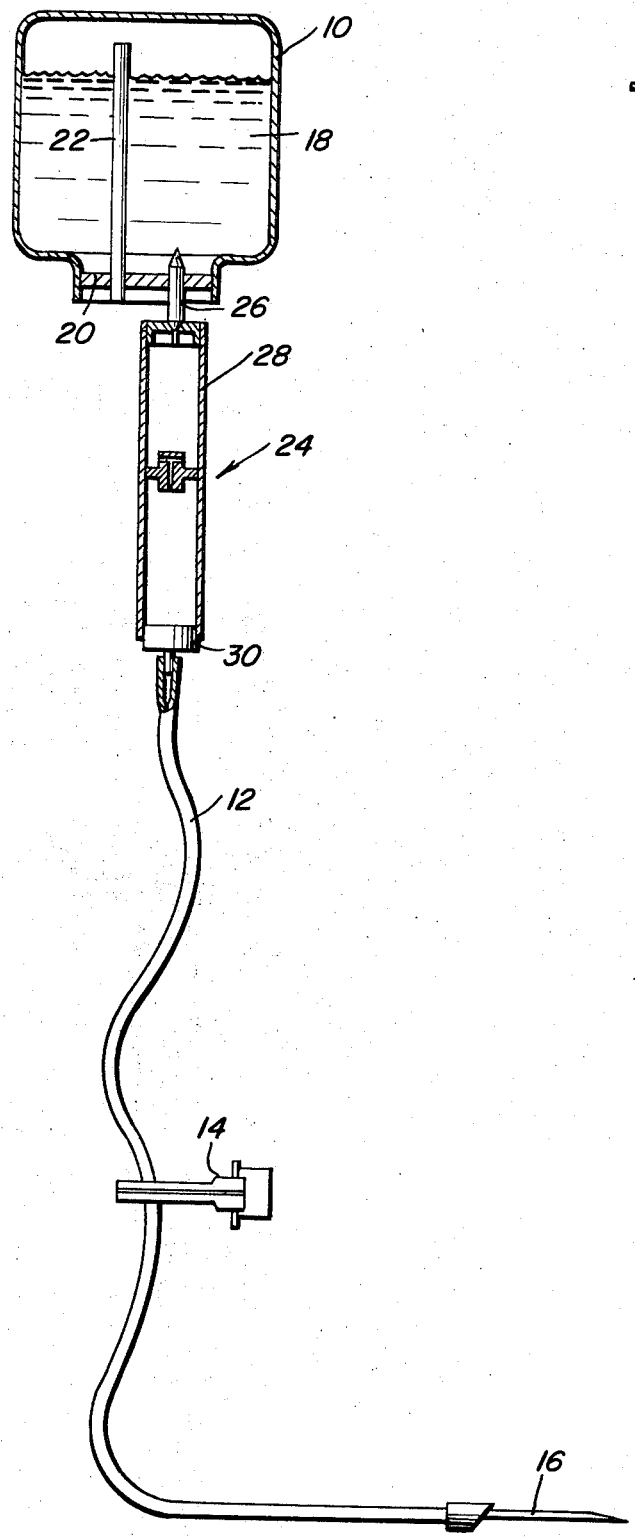
FIG. 1 is a schematic view of an intravenous parenteral fluid feeding system employing the inventive flow meter.

Communicating with the lower end of passageway 34 is a metal tube 36 having an outlet orifice 38 therein. The diameter of metal tube 36 is so selected that parenteral fluid flowing through inlet piece 26 will form droplets of about 1/60 of a milliliter in size. Consequently, 60 drops of parenteral fluid will fall from orifice 38 into transparent flexible tube 28 for each milliliter of fluid flowing through the device.

Figure 2:
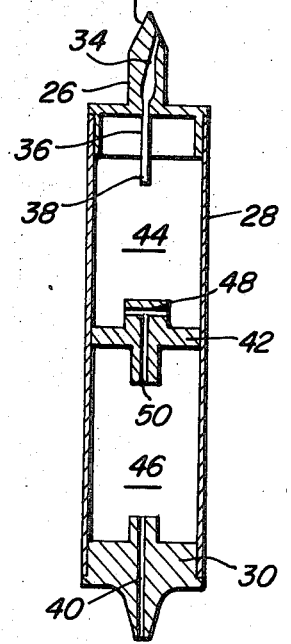
FIG. 2 is a longitudinal cross-sectional view of the inventive flow meter.

Securely attached to a lower portion of inlet piece 26 is transparent flexible tube 28, which can be made from any material which is transparent, flexible and pharmacologically inert and chemically inert to the parenteral fluid being passed. Secured to the bottom of transparent flexible tube 28 is outlet piece 30, which is also a solid piece of material. As shown in FIG. 2, outlet piece 30 is provided with an outlet passageway 40 therein for passing fluid collecting in the bottom of transparent tube 28 out of the device and into delivery tube 12 as shown in FIG. 1.

Located within transparent flexible tube 28 about midway between inlet piece 26 and outlet piece 30 is constrictor 42 which divides the interior of transparent flexible tube 28 into an upper chamber 44 and a lower chamber 46. Constrictor 42 is made from a solid piece of material circular in configuration and having a diameter slightly larger than the inside diameter of flexible tube 28. Because of this construction, constrictor 42 securely rests in the position shown in FIG. 2, additional mechanical or adhesive securing means being wholly unnecessary.

As shown in FIG. 2, constrictor 42 is provided with a fluid passageway 48 passing therethrough. Fluid passageway 48 communicates at one end with upper chamber 44 in transparent flexible tube 28 and at its other end with lower chamber 46. The diameter of fluid passageway 48, at least in its lower portion, is so selected that drops of parenteral fluid forming at the outlet orifice 50 of fluid passageway 48 are about 1/15 of a milliliter in size. Consequently, 15 drops of parenteral fluid will fall from passageway 48 into lower chamber 46 for each milliliter of fluid flowing through the device.

In operation, the inventive flow meter operates in much the same way as a conventional drip chamber. However, because of the inclusion of constrictor 42, a double drip chamber effect is actually provided. Specifically, as parenteral fluid 18 flows from parenteral fluid reservoir 10 through inlet piece 26 of the inventive flow meter, drops of approximately 1/60 to a milliliter in size are formed by and fall from orifice 38. Depending on the magnitude of the parenteral fluid flow rate, a particular number of drops per unit time will therefore fall into upper chamber 44 and collect above constrictor 42.

As each of the chambers 44 and 46 is primed before operation is initiated, the parenteral fluid housed above constrictor 42 simultaneously flows through fluid passageway 48 and down to orifice 50 where drops of 1/15 of a milliliter in size are formed. Again, depending on the magnitude of the parenteral fluid flow rate, a particular number of drops of this larger size per unit time will fall into lower chamber 46 and collect above lower cap 30.

The fluid housed in chamber 46 flows out of inlet piece 30, into delivery tube 12 and thereafter into intravenous needle 16. The device continues to operate as described above with drops of parenteral fluid falling through chambers 44 and 46 at rates corresponding to the flow rate of parenteral fluid determined by the setting of flow control valve 14. If and when the flow rate of the parenteral fluid changes, the number of drops falling through each chamber per unit time undergoes a concomitant change, with the device continuing to operate until the supply of parenteral fluid in parenteral fluid reservoir 10 has been exhausted.

The inventive parenteral fluid flow meter is capable of providing accurate determination of fluid flow rate with a great deal of ease regardless of the flow rate magnitude. This advantageous result is due to the fact that orifice 50 is adapted to form droplets 1/15 of a milliliter in size while orifice 38 of metal tube 36 is adapted to form droplets 1/60 of a milliliter in size. With this construction, for each milliliter of parenteral fluid flowing through the device, 15 drops of parenteral fluid fall from orifice 50 while 60 drops fall from metal tube 36. Consequently, even if the parenteral fluid is quite high, quite low, or somewhere intermediate, it is relatively easy to determine the number of drops per unit time which fall in either one or the other of the transparent flexible tube chambers, and hence the fluid flow rate can be easily determined.

Still another advantage of the inventive parenteral solution flow meter is that it is of very simple design and hence easy to manufacture. In particular, the inventive flow meter employs a transparent flexible tube which need preferably be only slightly longer than the transparent plastic tubes commonly employed in conventional drip chambers. In addition, by employing a constrictor 42 located as shown in the drawings and described above, a double drip chamber effect can be provided by using in addition to the constrictor only those parts necessary for a single drip chamber. This considerably reduces both the material costs of the inventive double drip chamber as well as the labor costs associated with assembling an entire intravenous feeding system. Finally, because the constrictor 42 is made with an outside diameter slightly larger than the inside diameter of transparent flexible tube 28, and further because transparent tube 28 is flexible, constrictor 42 can be securely placed in its proper location simply by mechanically forcing it in place, other mechanical or adhesive securing means being totally unnecessary. This also significantly reduces the expense of manufacturing the inventive flow meter.

Figure 3:
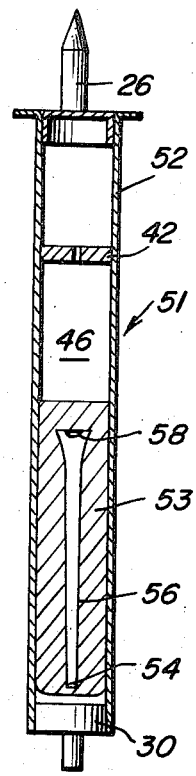
FIG. 3 is a schematic view partly in cross-section of an embodiment of the inventive flow meter combined with a rotometer-type flow meter. A DETAILED DESCRIPTION Referring to FIGS. 1 and 2, an intravenous feeding system is composed of a fluid supply reservoir 10, a delivery tube 12, a flow control valve 14 and a conventional intravenous feeding needle 16. Parenteral solution reservoir 10 is filled with parenteral solution 18 which is held in the reservoir by a cap 20. A filtered air inlet line 22 passes through cap 20 and is provided to admit air parenteral solution leaves the reservoir.

A preferred embodiment of the inventive flow meter is illustrated in FIG. 3. In this embodiment, the inventive flow meter 51 is constructed in essentially the same way as the embodiment shown in FIG. 2, except that flexible tube 52 is somewhat longer than flexible tube 28 employed in flow meter 24. In addition a lower portion of flexible tube 52 carries a rotameter type flow meter 53 which is cylindrical in shape and is snugly seated in flexible tube 52 so that no parenteral fluid can flow past the outside surfaces of the rotameter. Rotameter 53 is provided with a fluid passageway (not shown) placing lower chamber 46 of the inventive flow meter in the fluid communication with an inlet opening 54 of rotometer conduit 56. In addition, an outlet opening 58 in rotameter conduit 56 communicates with an outlet passageway (also not shown) in rotameter 53 for transporting parenteral fluid passing through rotameter conduit 56 to outlet piece 30 of the device. A small weight (not shown) more dense than the parenteral fluid being processed is located in rotameter conduit 56 for indicating the parenteral fluid flow rate as parenteral fluid passes through rotameter conduit 56. With this construction, parenteral fluid which passes through lower chamber 46 of the flow meter will pass upwardly through flow rate indicating rotameter channel 56 before it exits the inventive flow meter, where the small weight will indicate the parenteral fluid flow rate.

The exact construction of the cylindrical rotameter type flow meter employed in the preferred embodiment of the invention is described in U.S. Pat. Application Ser. No. 261,323 filed June 9, 1972. By incorporating such a rotameter type flow meter into a lower portion of flexible tube 52 of the inventive flow meter, two drip chambers and a rotameter type flow meter can be provided a single integral device which is compact, simple in design and very inexpensive to manufacture.

While only a few particular embodiments of the inventive flow meter have been illustrated above, it should be understood that many modifications can be made without departing from the spirit and scope of the invention. For example, it should be appreciated that the cross-sectional configuration of flexible tube 28 could be other than circular, but still allowing drops formed at orifice 38 and orifice 50 to freely fall through upper chamber 44 and lower chamber 46. Also, it should be understood that the particular size of orifice 38 in tube 36 and orifice 50 can be varied at will so that the drops formed by these orifices are any desired size. Moreover, it should also be understood that orifice 38 and orifice 50 can be selected so that the larger drops form in upper chamber 44 instead of lower chamber 46. Further, it should be appreciated that orifice 38 need not be formed from a metal tube such as metal tube 36 and further that orifice 50 need not be defined by the material forming constrictor 42. On the contrary, any means known in the art for statically forming droplets of a desired size can be used to form drops in inlet piece 26 and constrictor 42. Nor is it necessary that the transparent tubes 28 and 52 be flexible. On the other hand, if these tubes are made rigid, it becomes necessary to make provisions for attaching constrictor 42, for example, with a suitable inert adhesive.

The foregoing specification and drawings have been presented for illustrative purposes and are not intended to limit the invention in any way. All reasonable modifications not specifically set forth are intended to be included within the scope of the present invention, which is to be limited only by the following claims.

What is claimed is:

1. A flow meter for measuring the flow rate of a parenteral fluid to be intravenously fed into the veins of a patient comprising: a transparent tube; inlet means attached to one end of said transparent tube for receiving a parenteral fluid, said inlet means defining a first drop forming orifice for forming said parenteral fluid into drops of a first predetermined size; outlet means attached to the other end of said transparent tube, said outlet means adapted to discharge said parenteral fluid from said transparent tube; and constrictor means in said tube located intermediate said inlet means and said outlet means and defining a first transparent chamber with said inlet means and a second transparent chamber with said outlet means; said constrictor means adapted to receive drops of parenteral fluid falling from said first drop forming orifice, said constrictor means defining a second drop forming orifice for forming said parenteral fluid into drops of a second predetermined size, said second predetermined size being different from said first predetermined size.

2. Apparatus according to claim 1 wherein one of said predetermined sizes is 1/15 of a milliliter and further wherein the other of said predetermined sizes is 1/60 of a milliliter.

3. Apparatus according to claim 1 wherein said transparent tube is circular in cross section.

4. Apparatus according to claim 1 wherein said first drop forming orifice defined by said inlet means comprises a metal tube for forming drops.

5. Apparatus according to claim 1 wherein said constrictor means is located approximately in the longitudinal middle of said transparent tube.

6. Apparatus according to claim 1 further including a rotameter type flow meter positioned within said transparent tube in such a way that the flow of parenteral fluid past the outside surfaces of said rotameter is prevented.

7. Apparatus according to claim 6 wherein said, rotameter type flow meter employs a flow rate indicator more dense than said parenteral fluid.

8. Apparatus according to claim 1 wherein said transparent tube is adapted to be positioned so that its inlet end is vertically above its outlet end.

9. Apparatus according to claim 1 wherein said transparent tube is flexible.

10. A double drip chamber flow meter for indicating the flow rate of a parenteral fluid passing therethrough comprising: a transparent tube having an inlet end and an outlet end and adapted to be positioned with its inlet end vertically above its outlet end; inlet means located in said inlet end defining a first drop forming orifice adapted to form parenteral solution passed to said flow meter into droplets of a first predetermined size; outlet means located in said outlet end and adapted to discharge parenteral fluid from said transparent tube; and constrictor means positioned in said transparent tube intermediate said inlet means and said outlet means, said constrictor means having a fluid passageway therethrough defining an inlet orifice and an outlet orifice, said inlet orifice adapted to receive parenteral fluid from said inlet means, and said outlet orifice defining a second drop forming orifice adapted to form parenteral solution passing therethrough into droplets of a second predetermined size different from said first predetermined size and to deliver said droplets to said outlet means.

11. An intravenous feeding system including a parenteral fluid reservoir, a supply conduit in series flow with said reservoir for transporting said parenteral fluid from said reservoir to a patient, and an intravenous needle attached to said supply conduit for passing parenteral fluid directly into a vein of a patient, the improvement comprising: a double drip chamber flow meter comprising a transparent tube; inlet means at one end of said transparent tube for receiving an amount of parenteral fluid, said inlet means defining a first drop forming orifice for forming said parenteral fluid into droplets of predetermined size; outlet means at the other end of said transparent tube for discharging said parenteral fluid from said transparent tube; and constrictor means in said transparent tube located intermediate said inlet means and said outlet means, said constrictor means adapted to receive droplets of parenteral fluid falling from said inlet means, said constrictor means defining a second drop forming orifice for forming said parenteral fluid into droplets of a different size from those formed by said inlet means and to deliver said parenteral fluid to said outlet means.

* * * * *